Sept. 6, 1966 W. C. JOHNSON 3,271,553
OVERLAY WELDING
Filed June 24, 1965 3 Sheets-Sheet 1

INVENTOR.
Wallace C. Johnson
BY
ATTORNEYS

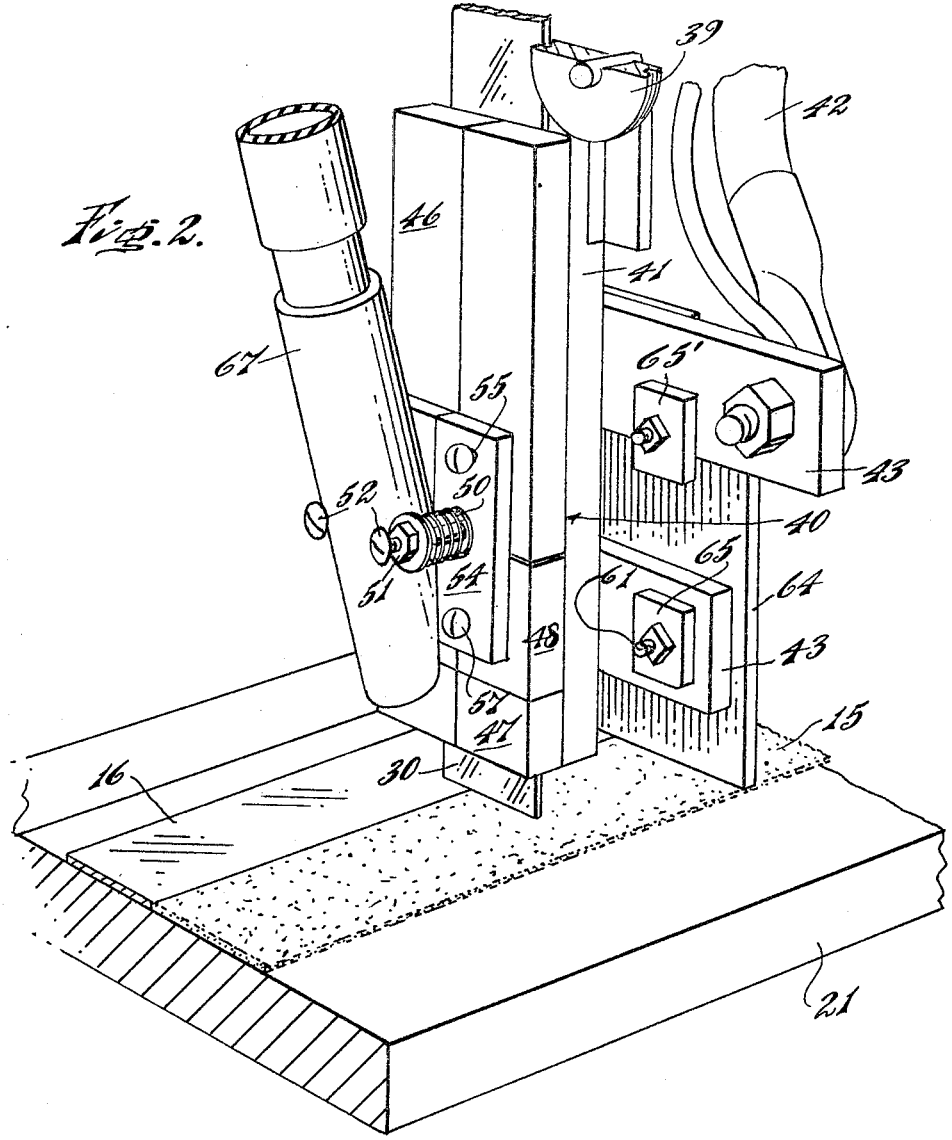

Sept. 6, 1966 W. C. JOHNSON 3,271,553
OVERLAY WELDING
Filed June 24, 1965 3 Sheets-Sheet 3
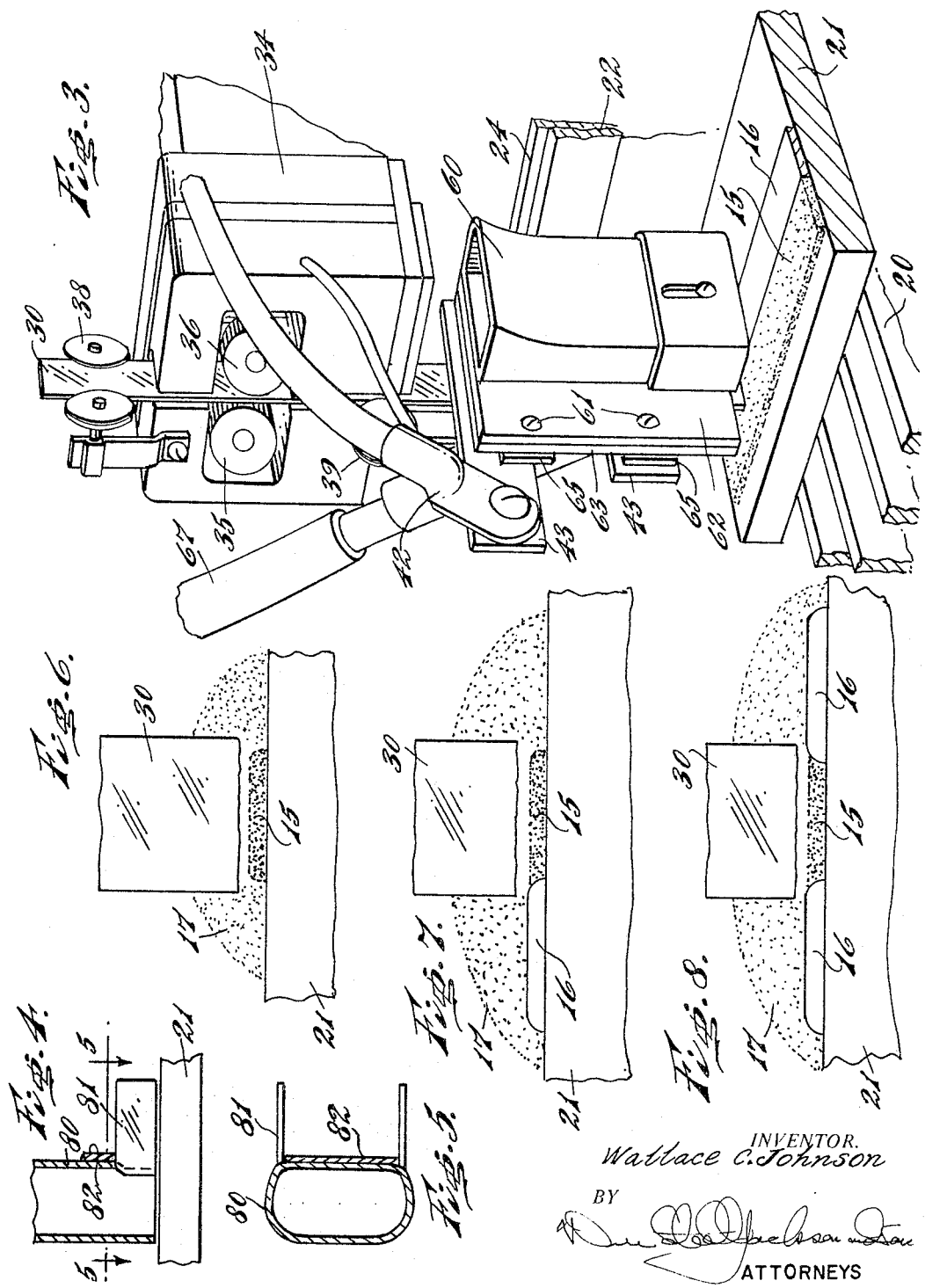

United States Patent Office 3,271,553
Patented Sept. 6, 1966

3,271,553
OVERLAY WELDING
Wallace C. Johnson, St. Davids, Pa., assignor to Arcos Corporation, Philadelphia, Pa., a corporation of Pennsylvania
Filed June 24, 1965, Ser. No. 466,709
4 Claims. (Cl. 219—76)

The present invention relates to electric arc welding and more particularly to overlay welding and cladding with strip electrodes to fuse a layer of loose metallic particles to the adjoining surface of a base metal.

A purpose of this invention is to deposit welding overlay at greatly increased deposition rates.

A further purpose is to make weld overlay as thick as a half inch or thicker in one pass from alloys such as stainless steel or Inconel deposited on a base metal such as plain carbon steel or low alloy steel.

A further purpose of this invention is to produce a weld overlay of controlled thickness, preferably a thin single layer overlay having an average thickness of .150 inch or even as thin as .125 inch.

A further purpose of this invention is to use a layer of metallic particles or granules alone or between and alongside of weld beads previously welded to the base metal with a wide strip electrode to obtain a wide single layer weld overlay.

A further purpose is to use a strip electrode to arc to a layer of granules that has previously been placed on the work surface alongside a weld bead, the strip electrode overlapping the edge of the bead while covering the entire width of the granules so as to obtain better fusion between the weld bead and the new weld formed from the granules than was heretofore obtainable when a round wire electrode was arced to a narrow train or layer of metallic particles.

A further purpose of this invention is to employ a strip electrode which overhangs the edges of two weld beads on either side of a layer of granules.

A further purpose is to adjust the overhang of a strip electrode beyond the layer of granules by skewing the strip electrode with respect to the length of the strip of particles so that the edge of the electrode which adjoins the previous weld bead can be forward in the direction of progression or rearward in the direction of progression as preferred.

A further purpose is to employ a flux-cored strip electrode.

A further purpose is to employ a wide strip electrode for the cladding of uneven or dished surfaces with metallic granules where flat barrier strips cannot be conveniently held in contact with the surface of the base metal.

A further purpose is to obtain hard surfacing with a wide strip electrode using a layer of metallic particles of high carbon or alloy content, which hard surfacing was not obtainable with the use of flat barrier strips.

A further purpose of this invention is to produce a hard surfacing weld overlay containing cobalt using a ductile cobalt strip electrode with a layer of metallic particles, which hard surfacing was not heretofore obtainable with the use of flat barrier strips.

A further purpose is to provide a method for producing a single bead, and especially a wide bead, of overlay weld at a greatly increased welding speed using a wide strip electrode and metallic granules in place of a conventional wire electrode.

Further purposes appear in the specification and claims.

In the drawings we have chosen to illustrate a few only of the numerous embodiments in which the invention may appear, selecting the forms shown from the standpoints of convenience in illustration, satisfactory operation and clear demonstration of the principles involved.

FIGURE 2 is a fragmentary perspective view of the machine of FIGURE 1 showing the strip electrode as it would pass over a layer of metallic particles previously placed on the metal base omitting the blanket of flux. In this view the metallic particles have been deposited alongside a weld bead previously welded to the base metal.

FIGURE 3 is a fragmentary perspective view taken from the right of FIGURE 1 omitting the upper portions of the machine but showing the forward hopper for depositing flux over the previously deposited layer of metallic particles ahead of the advancing strip electrode.

FIGURE 4 is a view of a metal particle feed tube in vertical section.

FIGURE 5 is a plan section on the line 5—5 of FIGURE 4.

FIGURE 6 is a sectional elevation in the vertical plane through the metal work and the layer of metallic particles with the blanket of flux being just ahead of the consumable metallic strip electrode.

FIGURE 7 is a sectional elevation in the vertical plane through a piece of metal work having a weld bead thereon and a layer of metallic particles adjacent the bead under a blanket of flux, the section being taken just ahead of the consumable metallic strip electrode.

FIGURE 8 is a sectional elevation similar to FIGURE 7 but showing two weld beads with the layer of metallic particles filling the void between them.

Figure 1:
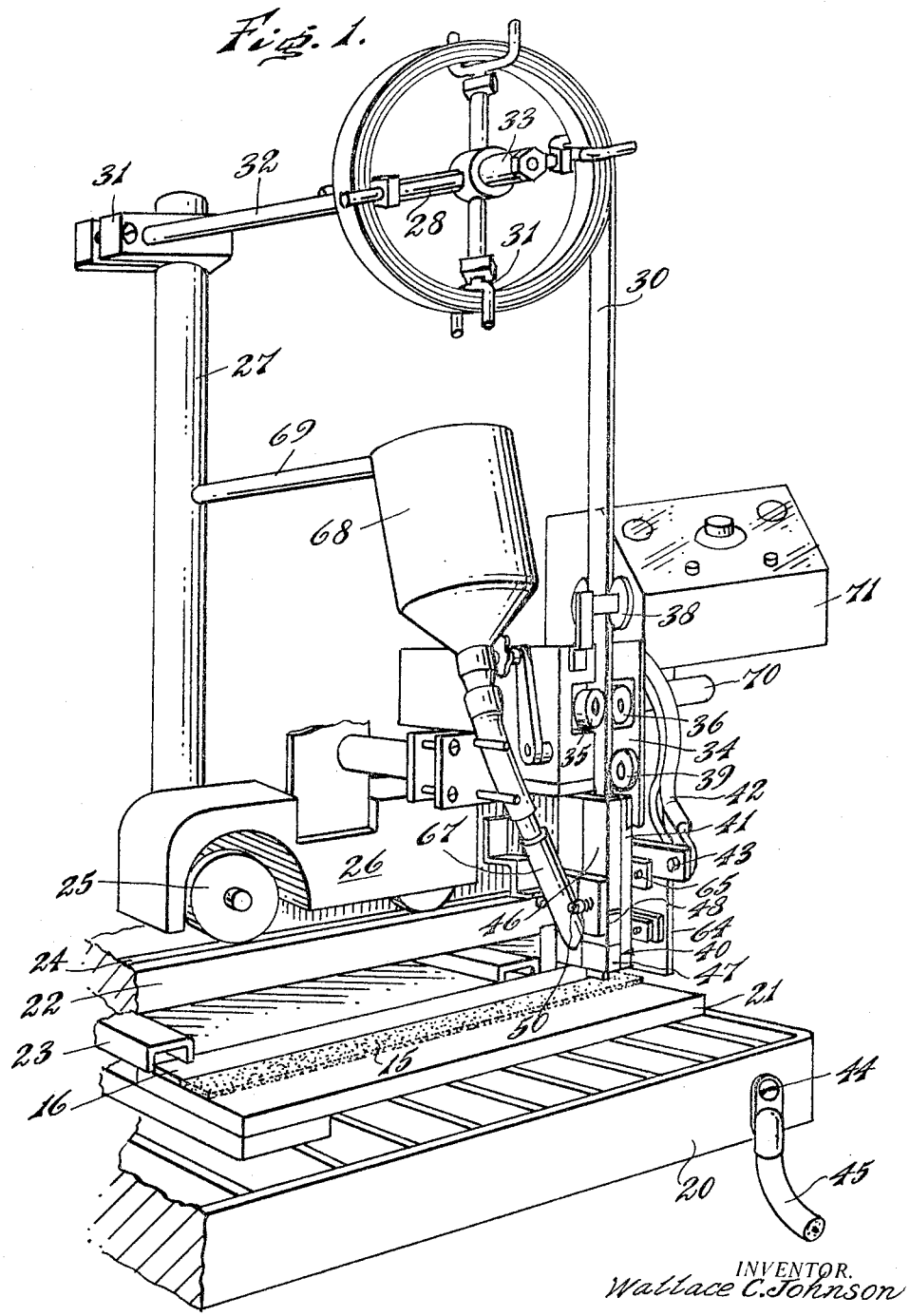
FIGURE 1 is a perspective view of the welding machine showing the dispenser for dispensing the blanket of flux over the layer of metallic particles behind the strip electrode, the view including the reel and mechanism for feeding the strip electrodes.

In U.S. application Serial No. 415,353, filed December 2, 1964, there is disclosed a method and apparatus for depositing overlay welding on a base metal with barrier strips using a strip electrode. Reference is hereby made to this application as to the details of the welding machine relating to its operation with respect to the feeding of flux and the consumable metallic strip electrode. In U.S. Patent No. 3,022,413, there is disclosed a process and apparatus for the overlay welding or cladding of a base metal using metallic particles. The present application is intended to cover the overlay welding with metallic particles using the novel wide strip electrode as disclosed in the aforementioned application.

By passing a strip electrode over a wide train of granules, better fusion to the base metal is obtainable than was possible using a round wire electrode over a narrow layer of granules as disclosed in the prior art patent. Using the strip electrode with its self-oscillating arc passing over the granules at least doubles the amount of weld deposited from that of a wire electrode as the wire limits the train of particles to about one inch in width. The combination also represents an improvement over the combination of rolled barrier strip and a strip electrode, for example in fusion cladding operations where it is difficult to lay a flat barrier strip and hold it in contact with a surface that is uneven or dish shaped.

The metallic particles can simply be poured onto the surface regardless of its contour, scraped to a wide flat path of uniform height and fused to the base by means of the strip electrode.

In cladding, it is often desirable that the metallic granules be laid on the work surface alongside a previously laid weld bead or between two previously laid weld beads. The strip electrode should then overlap the edge of the weld bead by about ⅜ inch to assure a good fusion of the new weld to the bead. Thus, the electrode strip should be at least ⅜ inch wider in width than the layer of metallic particles.

Referring to the drawings, and in particular FIGURE 1, I have illustrated a welding machine provided with a base 20 supporting a suitable plate 21 comprising the base metal which in many cases will be a plain carbon or low alloy steel. Adjoining the plate is a rail member 22 extending parallel to the layer of metallic particles 15 having support 23 and having a flange 24 fixed thereto. This flange guides the grooved rollers 25 on carriage 26 which advances the welding arc at a predetermined speed of progression across the work. The carriage may be suitably motor driven. Alternatively, the welding head can remain stationary while the work is traversed beneath it.

The carriage 26 supports a vertical support column 27 which mounts a reel 28 for the supply of the strip electrode 30 through adjustable clamps 31. The reel is pivotally mounted through arm 32 extending through the hub 33 of the reel 28 affixed to the clamp 31 at the other end. The reel is adjustable as is well known in the art to fit any desired size of a coil of the electrode. The strip electrode is relatively thin in the direction of progression of the arc but wide in a transverse direction thereto. The electrode 30 is advanced by conventional feeding mechanism 34 including idling roll 35 engaging one side of the strip and positive driven friction roller 36 on the other side by a suitable motor not shown. The feeding mechanism also includes guide rollers 38 and guide roller 39 disposed on an axis perpendicular to the axis of rollers 35 and 36.

The strip electrode passes through guide 40 having a copper shoe 41 receiving an electrical connection from a cable 42 through contact block 43 engaging the shoe 41. Electrical contact to the work is made by a clamp 44 connected to electric cable 45, both of the cables 42 and 45 extending to a welding generator, not shown. Opposed to shoe 41 there are relatively stationary copper shoes 46 and 47 with a movable shoe 48 disposed between them. This shoe 48 is spring biased against the strip in opposition to the contact shoe 41 by helical compression springs 50 acting through adjustable nuts 51 on spring securing bolts 52 as shown in FIGURE 2. The springs 50 act against levers 54 which are pivotally mounted at 55 on the shoe 46 and against a block not shown on the bolt 57 between the lever and the movable shoe 48. All of the shoes are suitably made of copper or other contact making metal. The electrode feed mechanism is more fully described in the aforementioned application relating to overlay welding with a strip electrode. Reference is hereby made not only to this feeding mechanism but to the alternative mechanism therein described.

While the metallic granules may be deposited on a bare piece of base metal and fused to the same according to the objects of this invention with a wide strip electrode, it is also common practice to first lay down a weld bead to which the metallic particles will subsequently be welded in addition to welding them to the base metal.

In the description of the drawings, there is shown a weld bead, but it is to be understood that the metallic particles can be fused to the base metal without a weld bead or between two weld beads.

The metallic particles are first deposited on the base metal either alone or between the weld beads and scraped to correct height according to the amount of penetration desired. Alternatively the metallic particles can be fed through a feeding mechanism similar to that shown in FIGURE 4 which could be conveniently mounted on the welding mechanism ahead of the flux hoppers and strip electrode. The tube 80 has guide flanges 81 and an adjustable gate 82, which serves as a thickness gauge depending upon the distance between the end of the gate and the base metal. This allows the thickness of the metallic particles to be adjusted so as to control the depth of penetration into the base metal and also to furnish the desired alloys that fuse into the overlay weld. The flow of particles to the tube could conveniently be controlled by a valve not shown or other suitable means including a plurality of sources to provide a mixture of metallic particles as a weld overly material.

Flux is suitably fed through a hopper 60 mounted ahead of the strip electrode on the carriage, the mounting suitably being accomplished by securing the chute to plate 62, the plate being affixed to contact blocks 43 through bolt 61 having electrically insulated bushing 65 and insulation plate 64 between the block 43 and the plate 62 to prevent arcing to the chute itself. The chute can either be fed automatically or through a scoop having an opening in the bottom corresponding to the desired amount of flux to be deposited. Since the strip electrode will tend to flatten out this mound of flux deposited by the hopper 60 a second source of flux is mounted behind the electrode on to the newly formed weld bead through a flexible chute 67 from a hopper 68 supported by bracket 69. This flux chute is adjustable with respect to the electrode as more fully described in the above identified U.S. application Serial No. 415,353.

Using a previously laid down weld bead suitably made from barrier strip, the layer of granules would be sled scraped to a uniform height of approximately 0.150 inch and to a width of approximately 2 inches, the train of granules being at least wide enough to engage the previously laid down weld bead but not so wide as the strip electrode. It is not essential that the metallic particles continuously adjoin the weld bead along its entire length but it is only necessary that they be in close proximity thereto.

A bracket 70 on the carriage supports the control panel 71 provided with suitable instruments and controls for controlling the welding operation.

In operation a submerged arc occurs between the lower end of strip electrode 30 and a weld pool formed by the melting metal from the strip electrode and the metallic particles 15. The weld pool also includes metal from the previous weld beads, if any, and also the base metal at the upper surface to form an effective overlay weld. As shown in FIGURES 6-8, the strip electrode arcs to the top of the metallic particle layer, the strip 30 overhanging the edge of previous weld beads, if any, but not appreciably beyond the edge of the metallic particles if there is no weld bead to laterally restrain the layer of particles.

In a particular embodiment the layer of metal particles or granules can be formulated from iron powders with proportions of chromium and nickel to make stainless steel overlays, as more specifically described in U.S. Patents Nos. 2,927,990 and 3,022,413.

*Example 1*

A one layer overlay was made on steel base plate using a strip electrode of type 304 stainless steel, two inches wide and 0.030 inch thick, the layer of metallic granules being sled scraped to a height of 0.150 inch in depth and 1¾ inches in width alongside a weld bead previously laid down on the base metal. The steel base metal consisted of .20% carbon, .68% manganese and .04% silicon with the remainder being iron and the composition of the metallic particles was as follows:

| | Percent |
|---|---|
| Carbon | .019 |
| Silicon | .65 |
| Chromium | 18.15 |
| Nickel | 10.10 |

With the balance iron.

And the composition of the stainless steel electrode was as follows:

| | Percent |
|---|---|
| Carbon | .035 |
| Manganese | 1.14 |
| Silicon | .68 |
| Chromium | 18.21 |
| Nickel | 9.53 |

With the balance iron.

The layer of metallic particles was held under a blanket of flux having the following composition by weight:

| | Percent |
|---|---|
| Fluorspar | 25 |
| Aluminum silicate | 15 |
| Clay | 2 |
| Calcium silicate | 48 |
| Manganese metal powder through 100 mesh | 3 |
| Chromium metal powder through 100 mesh | 6 |
| Deoxidizer (Aluminum metal powder through 100 mesh) | 1 |
| Sodium silicate, as above referred to, based on the weight of the dry ingredients | 20 |

Approximately 7 feet of electrode strip was deposited for every foot of overlay weld formed on the steel plate using a current of approximately 1000 amperes direct current, reversed polarity at 28–30 volts. The welding head holding the strip electrode travelled at 11 inches per minute. This deposited some 80 pounds of strip electrode and about 20 pounds of metallic granules. The stainless overlay weld deposit had the following composition:

| | Percent |
|---|---|
| Carbon | .049 |
| Manganese | .89 |
| Silicon | .85 |
| Chromium | 18.02 |
| Nickel | 9.40 | with a balance substantially iron indicating a very low dilution of less than 5% from fusion with the steel base plate.

This method of welding greatly increases the rate of deposition or welding speed in square feet per hour using wide strips electrodes with metallic particles over those presently obtainable using a wire electrode with metallic particles. It is thus possible with this invention to produce a low cost stainless steel overlay of 16% chrome on a mild steel base using, 70% low carbon ferrochrome metallic particles and a mild steel strip electrode. In a particular embodiment using flux as above described, it was found that 80 pounds of the steel strip electrode and 25 pounds of the 70% ferrochrome were fused to the steel base with a 5% dilution resulting in a combined alloy of 16% chrome iron stainless steel which is an inexpensive method for obtaining stainless steel overlays.

The rate of dilution of the strip electrode by the steel base plate may be greatly increased depending upon the welding current employed. If a high welding current is utilized, the dilution may be as much as 15 or 20% even though a barrier layer of metallic particles exists between the electrodes and the base metal. In conventional welding operations using a single hot strip without a barrier layer, dilution of the base metal is commonly around 25 or 30%. Thus, while a layer of metallic particles substantially prevents dilution as in the above example, dilution on the order of 10 to 15% will occur if high welding currents are used.

*Example 2*

A cobalt base hard surfacing one layer overlay was made on a steel base plate similar to the base metal used in Example 1, using a ductile cobalt strip electrode consisting esssentially of pure cobalt 2 inches in width and .030 inch thick. A layer of metallic granules was applied and scraped to a uniform height of approximately .150 inch in depth and 1½ inches in width. The composition of the metallic particles consisted by weight of 24 parts of chromium metal powder, 3 parts of high carbon containing chromium metal powder having at least 10% carbon with the remainder chromium, 3 parts of nickel, and 6 parts of molybdenum. A layer of flux similar to that used in Example 1 was used in producing the weld metal of this example.

64 parts of the cobalt strip electrode were deposited for every 36 parts of the metallic particles. Using a current of approximately 1,000 amperes direct current with straight polarity at 30 volts with the weld head speed approximately 15 inches per minute, 4 feet of electrode strip was deposited for every foot of overlay weld formed on a steel plate. This deposited approximately .88 pound of strip electrode and .47 pound of metal granules. The weld overlay deposited on the base metal had the following composition by weight:

| | Percent |
|---|---|
| Carbon | .3 |
| Molybdenum | 5.4 |
| Nickel | 2.7 |
| Chromium | 24.0 |
| Cobalt | 58.0 |

This indicates a dilution from the base metal of less than 10% thus producing a cobalt containing hard surface overlay weld according to the process of this invention.

In view of my invention and disclosure, variations and modifications to meet individual whim or particular need will doubtless become evident to others skilled in the art, to obtain all or part of the benefits of my invention without copying the process shown, and I, therefore, claim all such insofar as they fall within the reasonable spirit and scope of my invention.

Having thus described my invention what I claim as new and desire to secure by Letters Patent is:

1. A process of electric arc overlay welding on a base metal which has welded thereto at least one previous overlay weld bead extending along one surface of the base metal, which comprises laying down a layer of metallic particles approximately adjoining the edge of the previous weld bead and against the surface of the base metal, said layer of metallic particles being of uniform height, bringing the end of a strip electrode that is wider than it is thick into arcing proximity to the layer of metallic particles and to the edge of the previous weld bead, said strip electrode overhanging the edge of the previous weld bead and also the layer of metallic particles, maintaining an arc to a weld pool formed by melting the particles, the strip electrode, the edge of the previous weld bead, and the surface of the base metal, and advancing the strip electrode in the general direction of its thickness lengthwise of the layer of metallic particles and the adjoining weld bead.

2. A process of claim 1, wherein two parallel overlay weld beads are previously welded to the base metal in spaced relation to one another, which comprises distributing the metallic particles in the channel created between the two previous weld beads, bringing the end of the strip electrode into arcing proximity to the layer of metallic particles and to both adjoining edges of the previous weld bead, said strip electrode overhanging both adjoining edges of the previous weld beads and also the layer of metallic particles, and maintaining the arc to a weld pool formed by melting the particles, the strip electrode, both adjoining edges of the weld beads and the surface of the base metal.

3. A process of claim 1, in which the strip electrode consists essentially of metallic cobalt.

4. A process of claim 3, wherein the metallic particles comprise at least 60% of metallic chromium.

References Cited by the Examiner

UNITED STATES PATENTS

| 2,121,194 | 6/1938 | Hardy | 29—182.5 |
| 2,191,469 | 2/1940 | Hopkins | 219—76 |
| 2,848,593 | 8/1958 | Newman et al. | 219—73 |
| 2,927,990 | 3/1960 | Johnson | 219—73 |
| 3,193,661 | 7/1965 | Danhier | 219—146 |

RICHARD M. WOOD, *Primary Examiner.*